United States Patent
Lustenberger et al.

(10) Patent No.: US 7,462,808 B2
(45) Date of Patent: Dec. 9, 2008

(54) METHOD AND DEVICE FOR REDUNDANT DISTANCE MEASUREMENT AND MISMATCH CANCELLATION IN PHASE-MEASUREMENT SYSTEMS

(75) Inventors: Felix Lustenberger, Cham (CH); Thierry Oggier, Zurich (CH); Guido Becker, Losheim am See (DE); Laurent Lamesch, Reichlange (LU)

(73) Assignees: Mesa Imaging AG, Zurich (CH); IEE, Luxembourg (LU)

( * ) Notice: Subject to any disclaimer, the term of this patent is extended or adjusted under 35 U.S.C. 154(b) by 0 days.

(21) Appl. No.: 11/500,266

(22) Filed: Aug. 7, 2006

(65) Prior Publication Data
US 2007/0034778 A1 Feb. 15, 2007

(30) Foreign Application Priority Data
Aug. 8, 2005 (EP) .................. 05405466

(51) Int. Cl.
*G01N 21/00* (2006.01)
*G01S 17/00* (2006.01)
(52) U.S. Cl. .................... 250/208.1; 356/432
(58) Field of Classification Search .............. 250/208.1; 356/432; 324/640; 345/690
See application file for complete search history.

(56) References Cited
U.S. PATENT DOCUMENTS 6,100,540 A * 8/2000 Ducharme et al. ..... 250/559.38

2005/0190206 A1 * 9/2005 Lang et al. ................. 345/690

FOREIGN PATENT DOCUMENTS

| EP | 1 152 261 | 11/2001 |
|---|---|---|
| EP | 1 085 315 | 7/2003 |
| EP | 1 752 793 A1 | 2/2007 |
| WO | WO 96/15626 A | 4/1996 |
| WO | WO 2004/008175 A | 1/2004 |
| WO | WO 2004/027359 A | 4/2004 |

OTHER PUBLICATIONS

Schwarte, R., et al.: "New optical four-quadrant phase-detector integrated into a photogate array for small and precise 3D-cameras". Proceedings of the SPIE, SPIE, Bellingham, VA, US, vol. 3023, Feb. 11, 1997, pp. 119-128.

(Continued)

*Primary Examiner*—John R Lee
(74) *Attorney, Agent, or Firm*—Weingarten, Schurgin, Gagnebin & Lebovici LLP

(57) ABSTRACT

The method serves for canceling errors caused by mismatch of different signal paths in a photodetector with a plurality (k) of storage elements for the photogenerated signals, as typically used in phase-measurement systems. The signal-capturing process is performed in at least two measurement cycles (j). A first cycle (j=1) is executed with the conventional setup with no phase delay in the control signals. It is followed by further measurement cycles (j=2, 3, 4) which use control signals shifted by a constant phase shift (90°). Corresponding signals are read out through different signal paths. At the end, the signals corresponding to a certain phase ($\Phi$) are added, thus canceling possible offset values.

24 Claims, 5 Drawing Sheets

OTHER PUBLICATIONS

Büttgen, B., et al.: "Demonstration of a novel drift field pixel structure for the demodulation of modulated light waves with application in 3D image capture". Proceedings of the SPIE, SPIE, Bellingham, VA, US, vol. 5302, Apr. 2004, pp. 9-20.

Lange, R., et al.: "Demodulation pixels in CCD and CMOS technologies for time-of-flight ranging". Proceedings of the SPIE, SPIE, Bellingham, VA, US, vol. 3965, Jan. 24, 2000, pp. 177-188.

* cited by examiner

METHOD AND DEVICE FOR REDUNDANT DISTANCE MEASUREMENT AND MISMATCH CANCELLATION IN PHASE-MEASUREMENT SYSTEMS

This application claims priority to European application No. 05 405 466.3 filed Aug. 8, 2005.

FIELD OF THE INVENTION

This invention relates to solid-state photo-detecting, especially to phase-measuring techniques based on silicon integrated sensors. It further relates to offset-cancellation techniques in optical multi-channel data-acquisition systems. Furthermore it relates to validating measurement data in safety-critical applications by providing improved plausibility checks directly related to the chosen measurement method. Possible applications of the invention are found, for instance, in optical range detection as well as fluorescence life-time detection and other bio-sensing applications.

BACKGROUND OF THE INVENTION

Various approaches describe the integration of silicon-based image sensors measuring intensity, amplitude and phase of an incident electro-magnetic wave front in the optical spectrum (e.g., WO-96/15626). These optical phase-measurement techniques can be used in optical range sensing. In combination with a dedicated light source, the pixel can be used as time-of-flight (TOF) ranging system (cf. EP-1'152'261 A) and/or in chemical and bio-chemical sensing (cf. EP-1'085'315 A). Homodyne signal detection systems are characterized by demodulating the incoming signal with the same base frequency of the reference signal. Hence, in homodyne optical TOF ranging systems, the active illumination source is synchronized with the driving signal of various photo gates, which leads to an information-carrying signal content at DC (f=0) and which in turn can be directly converted to digital values by appropriate analog-to-digital converters (ADCs) in modern information-processing systems. On the other hand, in heterodyne systems, the frequency of the light source differs slightly from the gate-controlling reference frequency and hence avoids potential problems with DC drift over power supply and temperature variations in practical implementations. This approach is characterized by the fact that the information-carrying part of the signal is hidden in the frequency content of the signal and has to be extracted by appropriate time-domain or frequency-domain analysis. In both cases, however, the signal of the incident optical wave front is demodulated by generating appropriate electrical fields in the gate-controlled silicon area of the sensor.

The electrical field is in most cases controlled by some applied voltage at the sensor input. In this region exhibiting commonly a stair-cased or linear potential gradient, the photo-generated electrons tend to drift towards the region in the semiconductor with the highest (deepest) potential well due to the electrical field created within the semiconducting material. By appropriately controlling the gates, the photo-generated charge carriers can be directed into the different integration gates or read-out nodes. From the resulting output signals, the characteristics of the incoming wave front can then be derived immediately.

A commonly used implementation is to provide a pixel with four outputs and to direct the photo-generated charge carriers to each output during one quarter of the full period of the incoming optical wave. The phase can be deduced from the four outputs corresponding to the relative phases 0°, 90°, 180° and 270° according to:

$$\text{Phase } \varphi = \tan^{-1}\left(\frac{output0 - output180}{output270 - output90}\right) \quad (1)$$

At the same time, the simplified equations for the amplitude and the intensity values become:

$$\text{Amplitude } A = \frac{\sqrt{(output0 - output180)^2 + (output90 - output270)^2}}{2} \quad (2)$$

$$\text{Intensity } B = \frac{output0 + output90 + output180 + output270}{4} \quad (3)$$

One of the main problems of state-of-the-art implementations of such systems, either homodyne systems such as described in the above-mentioned 4-outputs example or heterodyne phase measurement methods, appears as soon as the different output signal paths do not behave identically at constant illumination levels. These non-idealities might be caused by mismatch effects at the solid-state imager level and in the complementary metal-oxide semiconductor active-pixel sensor (CMOS APS) read-out path as well as with the non-ideal driving controls of the gates. As can be seen from Equations (1) and (2), the calculations are based on difference values, which can be severely affected by different offset or gain values.

SUMMARY OF THE INVENTION

It is an object of the present invention to provide a method that is insensitive to mismatch non-idealities of the different output paths. It is a further object to provide a redundant phase-measuring system. The pixel architecture according to the present invention shall also overcome the problems of non-homogenous photo-generation and transportation of photo-generated carriers below the photo gates and within the signal path.

These and other objects are solved by the method and the device as defined in the independent claims. Preferred embodiments are indicated in the dependent claims.

The first part of the invention overcomes the problem of non-ideal output response comprising effects such as mismatch by properly executing the sampling measurements in a suitable order. The second part of the invention describes the possibility to ensure redundant measurements within the above described phase measuring system using similar considerations as with the non-ideality compensation technique for optical phase measuring systems.

In practice, a pixel architecture containing at least one pair of signal output paths will always suffer from non-equal behavior of said signal paths of any pair. The idea of the invention is to perform the signal-capturing process in at least two measurement cycles. In the case of two distinct measurement cycles, a first cycle will be executed with the conventional setup with no phase delay in the control signals. It will then be followed by a second cycle which uses inverted control signals and hence reading the signal through the second path. At the end, by adding the results of the two cycles, offset values are entirely canceled. This principle can be easily extended to any number of distinct measurement cycles which are suitably merged, e.g., added or averaged, at the end.

The inventive method for characterizing a remote scene by means of temporally modulated electromagnetic radiation comprises the steps of:
(a) selecting at least two different phases of the modulated electromagnetic radiation,
(b) emitting the electromagnetic radiation towards the scene,
(c) reflecting and/or scattering at least part of said radiation from the scene,
(d) transducing electromagnetic radiation reflected and/or scattered from the scene into an electric signal for each of the phases,
(e) allocating a storage element from a plurality of storage elements to each of the phases,
(f) storing each electric signal in the storage element allocated to the corresponding phase,
(g) reading out the storage elements, and
(h) evaluating characteristics of the scene from the electric signals.

At least one further measurement cycle comprising the above steps (a)-(g) is performed in which at least one storage element is allocated to a different phase than in the first measurement cycle, and electric signals from the first and the further measurement cycle are used in the evaluation step.

The inventive device for performing the method according to any of the preceding claims comprises:
a radiation source for emitting temporally modulated electromagnetic radiation,
a photodetector comprising
  sensor means for transducing incident electromagnetic radiation into an electric signal and
  at least two storage elements for storing electric signals generated by the sensor means,
timing means for defining a common time base of the radiation source and the photodetector,
evaluation means for evaluating characteristics of the scene from the electric signals, and
control means for controlling the mutual phase relation of the radiation source and the photodetector.

The pixel operational architecture subject of the present invention is characterized by performing the following steps:
(i) Photo-generation of electron/hole pairs in the optically sensitive semiconductor material. (ii) Directional drifting of charge carriers towards integration gates, storage capacitances or readout nodes by applying appropriate control voltages/currents and thus appropriate electrical fields on the electrodes. (iii) Accumulation of charge carriers over at least one integration cycle within said different integration gates, storage capacitances or output nodes. (iv) Storage of the charge carriers within each pixel for each single output path. (v) Repeating the steps (i)-(iv) (n−1) times by using control voltage signals delayed by a multiple of $2\pi/n$, where n is the number of measurement cycles and/or pairs of output paths.

The second part of the present invention relates to a phase-measuring device and also relates to a TOF range camera measuring the characteristics (phase, amplitude and/or intensity) of the incoming wave front. The present method allows detecting whether a pixel and the associated signal paths are fully operational and working according to specifications. The basic idea is to create information redundancy by performing at least two complete sets of acquisitions of the same scene, however sampled with different phase shifts of the emitted CW-modulated illumination source. For example, in a homodyne measurement setup the introduction of a controlled but arbitrary angular phase shift δ or time-domain shift t of the transmitted CW-modulated light source introduces a corresponding shift in distance of $$\Delta L = \frac{\delta}{360°} \cdot \frac{c}{2f}, \quad (4)$$

where $c \approx 3 \cdot 10^8$ m/s is the light velocity in vacuum and f is the modulation frequency. As for a specific numerical example where f=20 MHz and δ=180°, a directly induced distance shift of ΔL=3.75 m will be observed.

Assuming now that the changes within the scene between two distance/phase maps are negligible compared to the distance/phase modification caused by said artificially induced phase shift, the difference of said two measurements has to be approximately the distance/phase value corresponding to said phase shift. This controllable difference of the distance/phase values between two sequential measurement cycles within a short period of time allows verifying the entire signal paths from the signal generation to the calculated output maps by applying simple plausibility checks.

The artificial phase shift can be chosen arbitrarily and/or switched by 180° for every measurement. Thus the second part of the invention can be combined with the idea of offset cancellation of the first part of the invention and hence, the system functionality can be verified at each measurement cycle without losing speed performance of the overall phase-measurement system. Furthermore, the amplitude value together with the intensity value can be used as a mean to check the quality of the performed phase measurement.

For all above-mentioned combinations of phase shifting, the order may be fixed, random or pseudo-random. The randomized phase-shift pairs potentially avoid or reduce harmonic interferences in the data-acquisition systems. Furthermore, randomized phase-delay keying enables the detection of all error-event combinations in the case of complex safety systems.

BRIEF DESCRIPTION OF THE DRAWINGS

Embodiments of the invention are described in greater detail hereinafter relative to the attached schematic drawings.

DESCRIPTION OF PREFERRED EMBODIMENTS

In a preferred embodiment of the method according to the invention, electromagnetic radiation is emitted towards the scene to be imaged. At least part of said radiation is reflected and/or scattered from the scene. At least two, and generally n≧2, different phases Φ of the modulated electromagnetic radiation are selected. So far, the method corresponds to the prior art.

Figure 1:
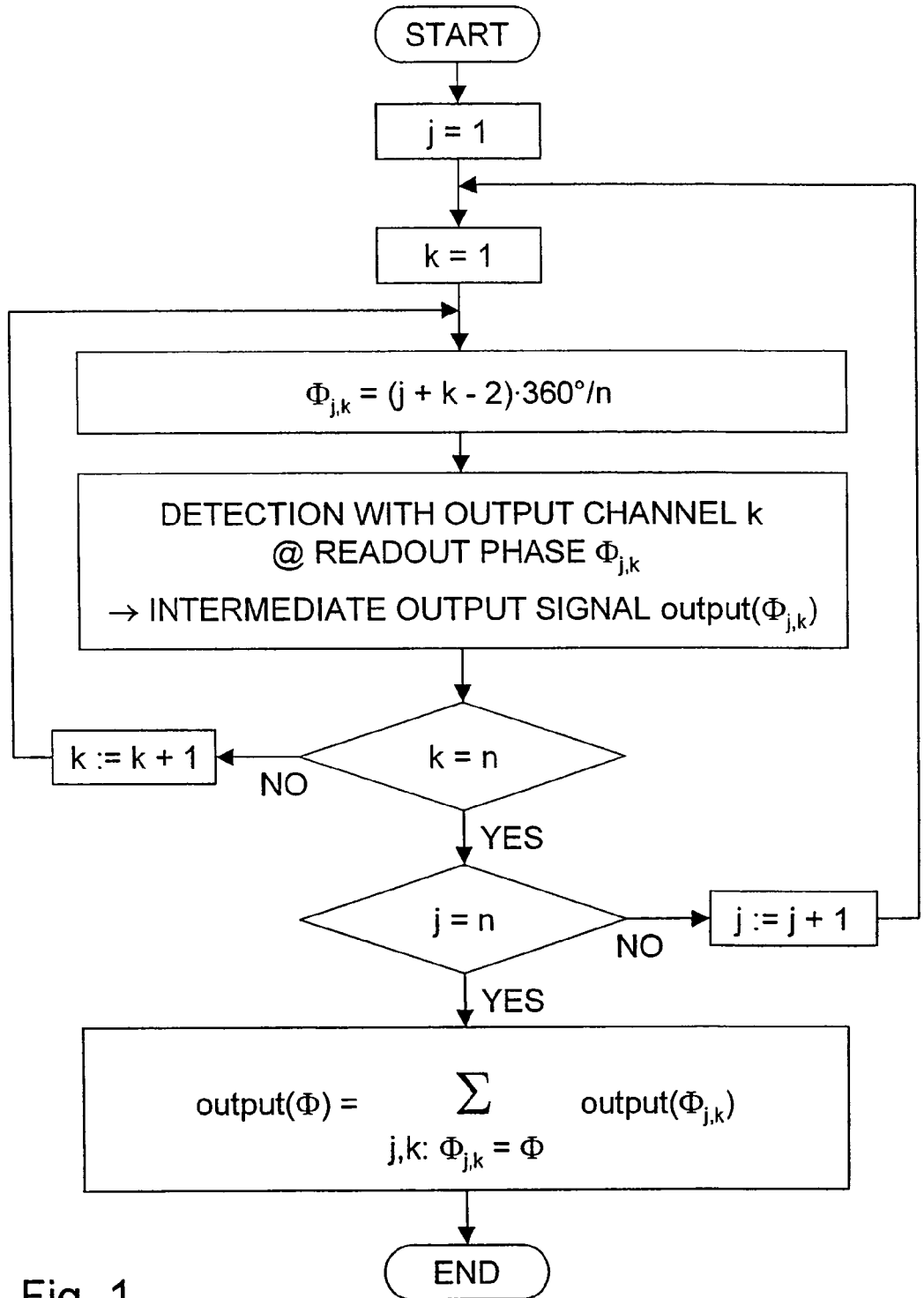
FIG. 1 shows a flow chart of an embodiment of part of the method according to the invention.

FIG. 1 shows a flow chart of the detection part of a possible implementation of the method according to the invention. The following integer variables are used:
n>1 number of output channels in each pixel;

j=1, ..., n control variable indicating the current measurement cycle;

k=1, ..., n control variable indicating the current output channel.

At the beginning, the control variables j and k are each set to one. Two encapsulated loops are performed. In an inner loop, wherein the control variable k is increased by one, readout phases $\Phi_{j,k}=0, 2\pi/n, \ldots, (n-1)2\pi/n$ (or, in degrees, $\Phi_{j,k}=0, 360°/n, \ldots, (n-1)\cdot 360°/n$) are calculated. For each readout phase $\Phi_{j,k}$ a corresponding pixel output is read out, yielding an intermediate output signal output $(\Phi_{j,k})$. The intermediate output signals output $(\Phi_{j,k})$ are stored. In an outer loop, wherein the control variable j is increased by one, the steps described above are repeated, but with a different readout phase $\Phi_{j,k}$ for each output channel k. In each measurement cycle j, the readout phase $\Phi_{j,k}$ is shifted by $2\pi/n$ (or 360°/n) compared to the previous measurement cycle (j−1) for a given output channel k. After performing all n measurement cycles, the intermediate output signals output $(\Phi_{j,k})$ are summed up for each readout phase $\Phi=0, 2\pi/n, \ldots, (n-1)2\pi/n$, yielding an output signal output $(\Phi)$. These output signals output $(\Phi)$, wherein $\Phi=0, 2\pi/n, \ldots, (n-1)2\pi/n$, are essentially free of mismatch non-idealities of the output channels. They can be evaluated using formulas such as Equations (1), (2) and/or (3) given above.

Figure 2:
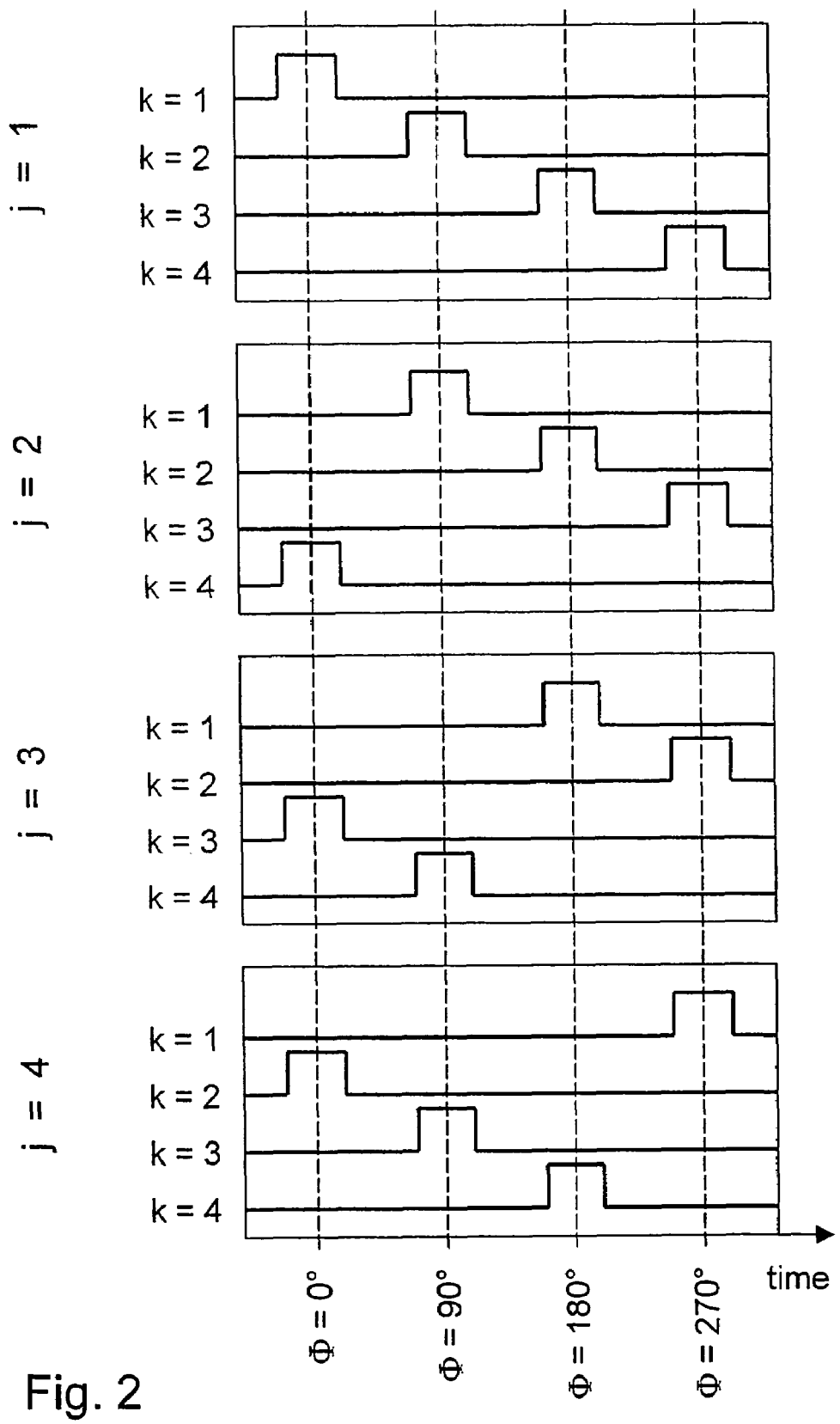
FIG. 2 shows intermediate output signals of four output channels during four measurement cycles versus time in an embodiment of the method according to the invention.

The principle of the method according to FIG. 1 is schematically illustrated in FIG. 2. This example is for a pixel with four output channels, i.e., n=4, which is, however, not limiting. According to FIG. 1, the method consists of four measurement cycles j=1, 2, 3, 4. In each measurement cycle j, each output channel k=1, 2, 3, 4 is read out, and the intermediate output signals are stored. In the simplified representation of FIG. 2, the intermediate output signals are represented as lines with two possible levels (e.g., 0 and 1), wherein the lower level (0) means "no readout" and the higher level (1) means "readout". In practice, the intermediate output signals will, of course, not be identical for all output channels k=1, 2, 3, 4, nor for all measurement cycles j=1, 2, 3, 4. The aim of FIG. 2 is to clarify the shifts of the readout phases $\Phi_{j,k}$ for the various output channels k=1, 2, 3, 4 and for the various measurement cycles j=1, 2, 3, 4. The method described in FIG. 2 allows a complete cancellation of the offset as well as the gain mismatch between the four output channels. The main drawback in here is that in total four images have to be acquired.

Figure 3:
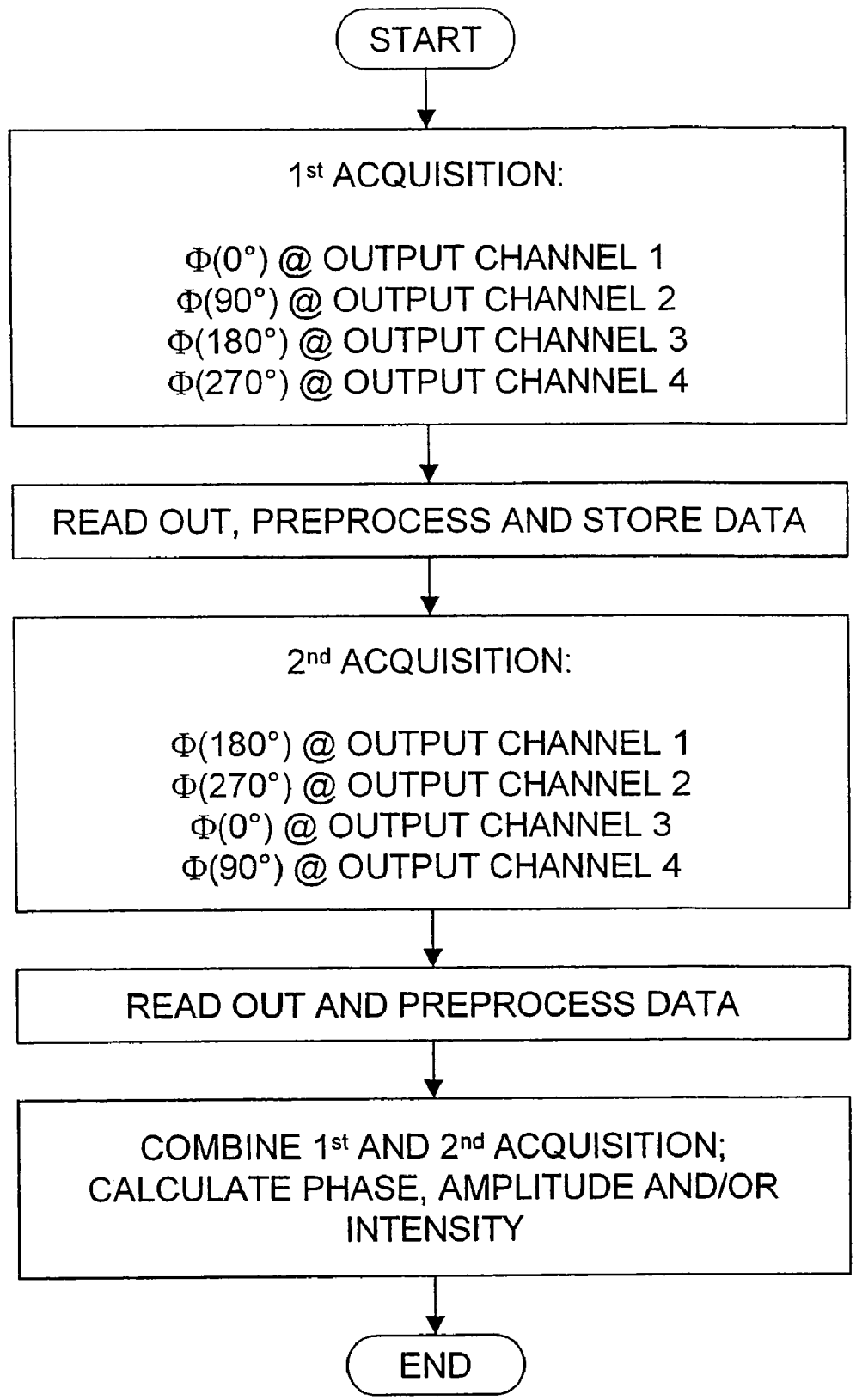
FIG. 3 shows a flow chart of the embodiment of part of the method according to the invention based on a pixel with four storage sites and output channels and two image sequences relatively delayed by 180°.

FIG. 3 shows a second possible implementation of the method according to the invention, targeting on high speed acquisition (less images to acquire) in combination with canceling at least some of the mismatch components between the channels. The embodiment presented in FIG. 3 is based again on a pixel comprising four storage sites and therefore four output channels. After the acquisition of the first image with the relative output signals 0°, 90°, 180° and 270° at the channel 1, 2, 3 and 4, a second image acquisition is performed by controlling the systems (either sensor control, illumination control or both) in such a way that the channel 1 outputs signal 180°, channel 2 signal 270°, channel 3 signal 0° and channel 4 signal 90°. By combining these two results, all offsets are cancelled with respect to Equation (2). If the intensity B from Equation (3) is not of use, only the differences (signal0°-signal180° and signal90°-signal270°) deriving from the first image acquired have to be stored. The method of FIG. 3 applied on a pixel with four output channels cancels all offset effects but cannot completely cancel the mismatch in gain of the different channels. However, the embodiment shown in FIG. 3 is faster (higher acquisition speed) than the embodiment shown in FIG. 2.

Figure 4:
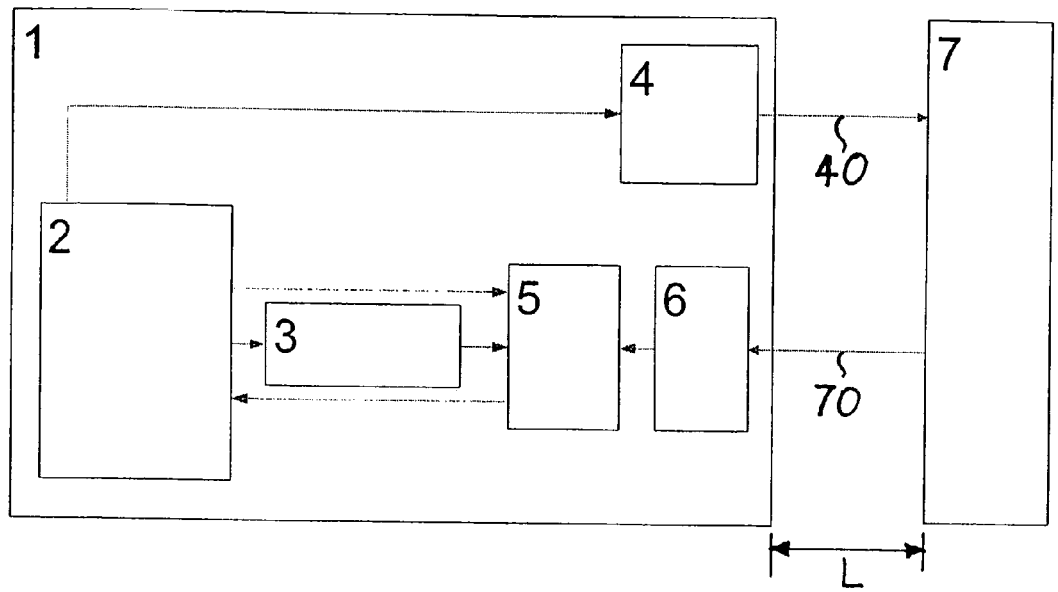
FIGS. 4-6 show block diagrams of three embodiments of the distance-measurement device according to the invention.
Figure 5:
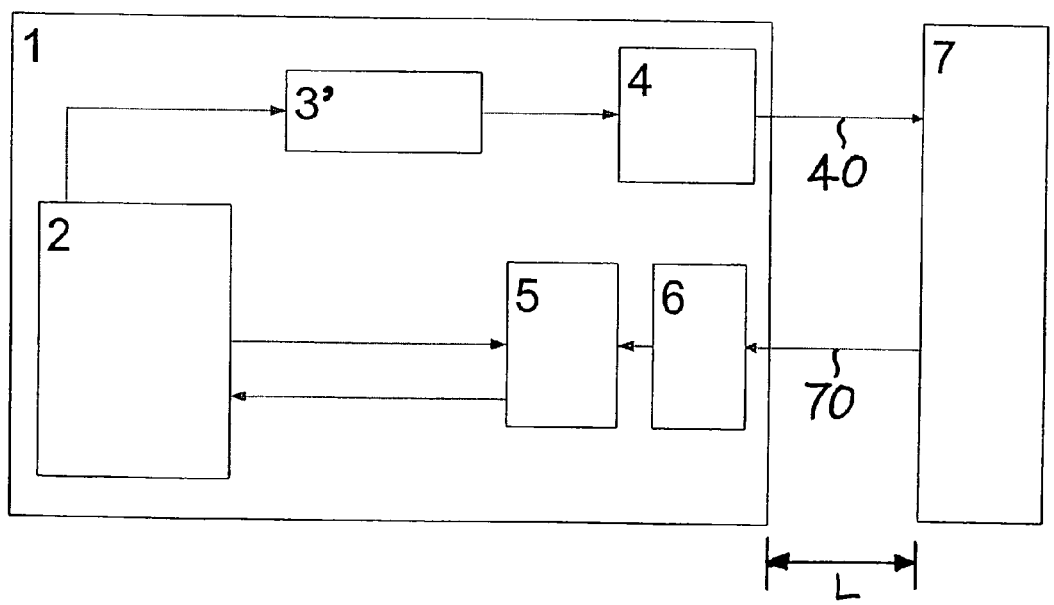
Figure 6:
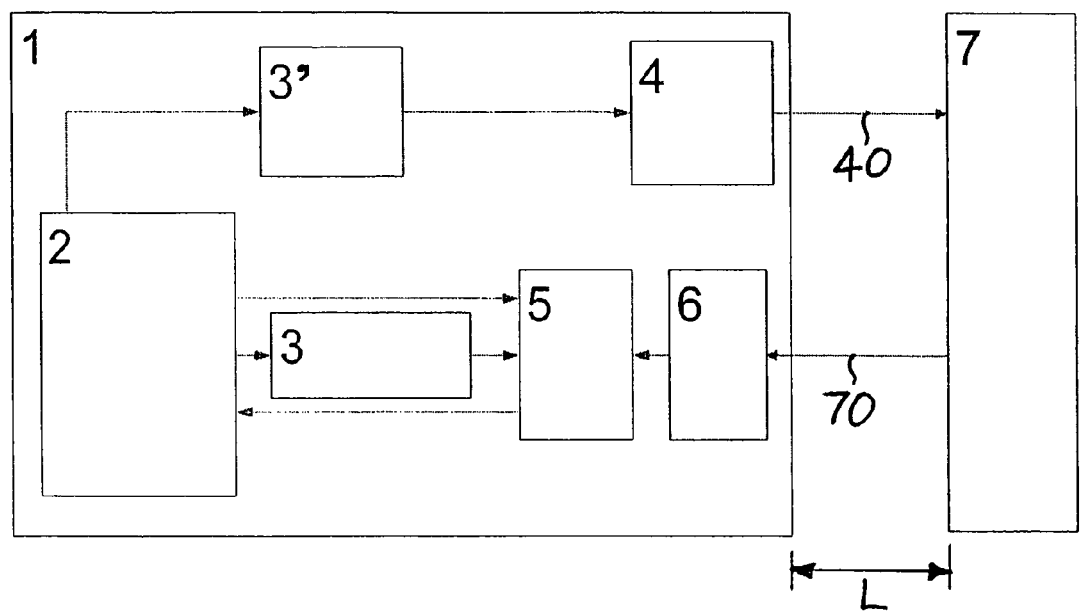

FIGS. 4-6 show various embodiments of devices according to the invention, by means of which the methods according to the invention can be performed.

A first preferred embodiment of the device 1 according to the present invention with a phase-measuring system for incident optical wave fronts is shown in FIG. 4. The device 1 comprises a light source or illumination source 4 for emitting electromagnetic radiation 40 towards a scene 7. The device 1 serves, e.g., for determining a distance L between the device and an object in the scene 7. Electromagnetic radiation 70 reflected and/or scattered by the scene 7 is detected by a lock-in image sensor 5, after passing imaging optics 6. The device 1 employs two distinct measurement cycles that differ by a phase shift of $\pi$ (which corresponds to 180°). The phase shift is induced in a controllable delay generator 3 which affects demodulation gates of the lock-in image sensor 5. This applies to the method presented in FIG. 3. The correct mutual timing of the controllable delay generator 3 and the lock-in image sensor 5 is controlled by a timing generator or system controller 2. The output signals of the two distinct measurement cycles are properly added before performing the necessary calculation steps to extract phase, amplitude and/or intensity values.

A second preferred embodiment of the device according to the present invention is characterized by extending the two measurement cycles of the first preferred embodiment of FIG. 4 to n measurement cycles (where n>2 is an integer) and hence inducing phase shifts that are an integer multiple of $2\pi/n$ (which corresponds to 360°/n). Again, before starting the final calculations of phase, amplitude and/or intensity values, the individual intermediate output signals from the plurality of measurement cycles have to be added properly. A further embodiment may include random or pseudo-random arrangements of the phase delays in order to break correlations to harmonic events in the data-acquisition system.

FIG. 5 shows a third preferred embodiment of the device 1 according to the present invention. The device comprises a phase-measuring system for incident optical wave fronts. It employs two distinct measurement cycles that differ by a phase shift of $\pi$ (which corresponds to 180°) induced in the controllable delay generator 3 which affects the phase lag of the illumination unit 4. The output signals of the two distinct measurement cycles are properly added before performing the necessary calculation steps to extract phase, amplitude and intensity values.

A fourth embodiment of the device according to the present invention is characterized by extending the two measurement cycles of the third preferred embodiment of FIG. 5 to n measurement cycles (where n>2 is an integer) and hence inducing phase shifts that are an integer multiple of $2\pi/n$. Again, before starting the final calculations of phase, amplitude and intensity values, the individual intermediate output signals from the plurality of measurement cycles have to be added properly. A further embodiment may include random or pseudo-random arrangements of the phase delays in order to break correlations to harmonic events in the data-acquisition system.

A fifth embodiment of the device 1 according to the present invention comprises a phase-measuring system for incident optical wave fronts according to FIG. 5. It employs two distinct measurement cycles that differ by a phase shift of $\pi$ (which corresponds to 180°) induced in a controllable delay generator 3' which affects the phase lag of the illumination unit 4. The output signals of the two distinct measurement cycles are used for the calculation of two distinct sets of phase, amplitude and/or intensity values. These two sets of phase values together with amplitude and intensity values are compared and, by means of plausibility considerations, are used to verify the proper functionality of the entire device 1.

A sixth preferred embodiment according to the present invention is characterized by extending the two measurement cycles of the fifth embodiment of FIG. 5 to n measurement cycles (where n>2 is an integer) and hence inducing phase shifts that are an integer multiple of $2\pi/n$. Again, these n sets of phase values together with amplitude and/or intensity values are compared and, by means of plausibility considerations, are used to verify the proper functionality of the entire device 1. A further embodiment may include random or pseudo-random arrangements of the phase delays in order to break correlations to harmonic events in the data-acquisition system.

A seventh embodiment of the device 1 according to the present invention comprises a phase-measuring system for incident optical wave fronts according to FIG. 6, employing at least three distinct measurement cycles that differ by a phase shift of $2\pi/n$, where n is the number of measurement cycles, induced in both, the controllable delay generator 3 which affects the demodulation gates of the lock-in image sensor 5 and the controllable delay generator 3' which affects the illumination unit 4. The output signals of said at least three distinct measurement cycles are properly added before performing the necessary calculation steps to extract phase, amplitude and/or intensity values. Furthermore, plausibility checks on these calculated phase/distance values enable the verification of proper operation of the entire device 1. A further embodiment may include fixed, random or pseudo-random arrangements of the phase delays in order to break correlations to harmonic events in the data-acquisition system.

This invention is not limited to the preferred embodiments described above, to which variations and improvements may be made, without departing from the scope of protection of the present patent.

LIST OF REFERENCE SIGNS

1 Device
2 Timing generator or system controller
3 Controllable delay generator for the control of photo gates
3' Controllable delay generator for the light source
4 Light source
40 Emitted light
5 Lock-in image sensor
6 Imaging optics
7 Surrounding scene
70 Reflected and/or scattered light
L Distance between the device and an object in the scene

The invention claimed is:

1. A method for characterizing a remote scene using temporally modulated electromagnetic radiation, comprising:
   (a) selecting at least two different phases of the modulated electromagnetic radiation,
   (b) emitting the electromagnetic radiation towards the scene,
   (c) transducing electromagnetic radiation reflected and/or scattered from the scene into an electric signal for each of the at least two different phases,
   (d) allocating a storage element from a plurality of storage elements to each of the at least two different phases,
   (e) storing each electric signal in the storage element allocated to the corresponding phase,
   (f) reading out the storage elements and storing intermediate output signals,
   (g) performing at least one further measurement cycle comprising the above steps (b)-(f) using the same at least two different phases, wherein each of the storage elements is allocated to a different one of the at least two different phases than in a previous measurement cycle,
   (h) merging the intermediate output signals from a first and further measurement cycles that correspond to the same phase of the at least two different phases, yielding one output signal per phase, and
   (i) evaluating characteristics of the scene from the output signals corresponding to the at least two different phases.

2. The method according to claim 1, wherein the at least two different phases are chosen such that they lie within one modulation period.

3. The method according to claim 1, wherein the at least two different phases are chosen randomly or pseudo-randomly.

4. The method according to claim 1, wherein the number of phases is chosen such that it is equal to the number of storage elements available in a device used.

5. The method according to claim 1, wherein the at least two different phases are equally spaced from each other.

6. The method according to claim 1, wherein each storage element is allocated to a phase shifted by a constant phase shift with respect to another measurement cycle.

7. The method according to claim 6, wherein the phase shift is $2\pi/n$, where $n \geq 2$ is an integer.

8. The method according to claim 1, wherein the allocation of at least one storage element to a different phase is performed by influencing the emission of the electromagnetic radiation and/or by influencing the transduction of the electromagnetic radiation.

9. The method according to claim 1, wherein a different storage element is allocated to each phase in different measurement cycles.

10. The method according to claim 9, wherein a total number of measurement cycles performed is equal to the number of selected phases.

11. The method according to claim 10, wherein in each measurement cycle, the allocation of the storage elements is a cyclic exchange of the allocation used in the previous measurement cycle.

12. The method according to claim 1, wherein a distance (L), preferably a distance between a device performing the method and a remote object in the scene, is evaluated as a characteristic of the scene.

13. The method according to claim 1, wherein the first and further measurements cycles are repeated with a known phase shift added to the same at least two different phases, yielding two distinct sets of at least one of phase, amplitude, and intensity values characterizing the remote scene; and
   the two sets of phase values together with amplitude and intensity values are compared and, by means of plausibility considerations, used to verify the proper functionality of a device carrying out the method.

14. A device for performing the method according to claim 1, comprising:
   a radiation source for emitting temporally modulated electromagnetic radiation;
   a photodetector comprising:
      an image sensor for transducing incident electromagnetic radiation into an electric signal and at least two storage elements for storing electric signals generated by the image sensor;

a timing generator or system controller for defining a common time base of the radiation source and the photodetector; and evaluation means for evaluating characteristics of the scene from the electric signals, a controllable delay generator for controlling the mutual phase relation of the radiation source and the photodetector; and means for merging intermediate output signals read-out from the at least two storage elements during different measurement cycles.

15. The device according to claim 14, comprising a plurality of photodetectors arranged in a one- or two-dimensional matrix.

16. The device according to claim 14, wherein the controllable delay generator is connected to the photodetector for influencing the same.

17. The device according to claim 14, wherein the controllable delay generator is connected to the radiation source for influencing the same.

18. The method according to claim 2, wherein:

the phases are chosen randomly or pseudo-randomly;

the number of phases is chosen such that it is equal to the number of storage elements available in a device used;

the phases are equally spaced from each other;

each storage element is allocated to a phase shifted by a constant phase shift of $2\pi/n$, where $n \geq 2$ is an integer, with respect to another measurement cycle;

the allocation of at least one storage element to a different phase is performed by influencing the emission of the electromagnetic radiation and/or by influencing the transduction of the electromagnetic radiation;

the same phase is selected in at least two measurement cycles, but different storage elements are allocated to said phase in different measurement cycles;

the same phases are selected in all measurement cycles, but a different storage element is allocated to each phase in different measurement cycles;

prior to the evaluation step, the electric signals that have been transduced in different measurement cycles and correspond to the same phase are merged to form one output signal per phase;

the total number of measurement cycles performed is equal to the number of selected phases ;

in each measurement cycle, the allocation of the storage elements is a cyclic exchange of the allocation used in the previous measurement cycle;

a distance (L), preferably a distance between a device performing the method and a remote object in the scene, is evaluated as a characteristic of the scene.

19. The method according to claim 7, wherein:

a distance (L), preferably a distance between a device performing the method and a remote object in the scene, is evaluated as a characteristic of the scene;

a first distance is evaluated for a first measurement cycle, a second distance is evaluated for a second measurement cycle, and it is further evaluated whether the difference ($\Delta L$) of the second and the first distances corresponds to said constant phase shift ($\delta$) in order to control a correct performance of the method.

20. A device for performing the method according to claim 18, comprising:

a radiation source for emitting temporally modulated electromagnetic radiation;

a photodetector comprising:

an image sensor for transducing incident electromagnetic radiation into an electric signal and at least two storage elements for storing electric signals generated by the image sensor;

a timing generator or system controller for defining a common time base of the radiation source and the photodetector;

evaluation means for evaluating characteristics of the scene from the electric signals, a controllable delay generator for controlling the mutual phase relation of the radiation source and the photodetector; and means for merging intermediate output signals read-out from the at least two storage elements during different measurement cycles.

21. The device according to claim 20, comprising a plurality of photodetectors arranged in a one- or two-dimensional matrix.

22. The device according to claim 15, wherein:

the controllable delay generator is connected to the photodetector for influencing the same; or the controllable delay generator is connected to the radiation source for influencing the same.

23. The device according to claim 21, wherein:

the controllable delay generator is connected to the photodetector for influencing the same; or the controllable delay generator is connected to the radiation source for influencing the same.

24. The method according to claim 13, wherein the differences between sets of distances calculated from the two distinct sets of values is compared to the distance corresponding to the phase shift.

* * * * *

UNITED STATES PATENT AND TRADEMARK OFFICE
CERTIFICATE OF CORRECTION

| | | |
|---|---|---|
| PATENT NO. | : 7,462,808 B2 | Page 1 of 1 |
| APPLICATION NO. | : 11/500266 | |
| DATED | : December 9, 2008 | |
| INVENTOR(S) | : Felix Lustenberger et al. | |

It is certified that error appears in the above-identified patent and that said Letters Patent is hereby corrected as shown below:

Column 9, line 3, "and" should be deleted.

Signed and Sealed this

Nineteenth Day of May, 2009

JOHN DOLL
*Acting Director of the United States Patent and Trademark Office*